May 5, 1942.  W. C. DAVIS  2,281,923
LAWN MOWER PACKAGE
Filed April 29, 1940  2 Sheets-Sheet 1
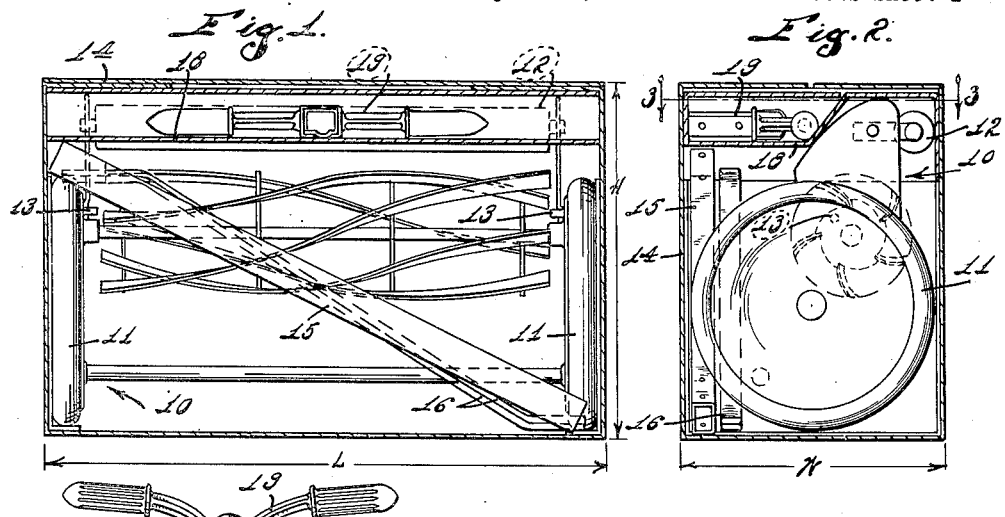
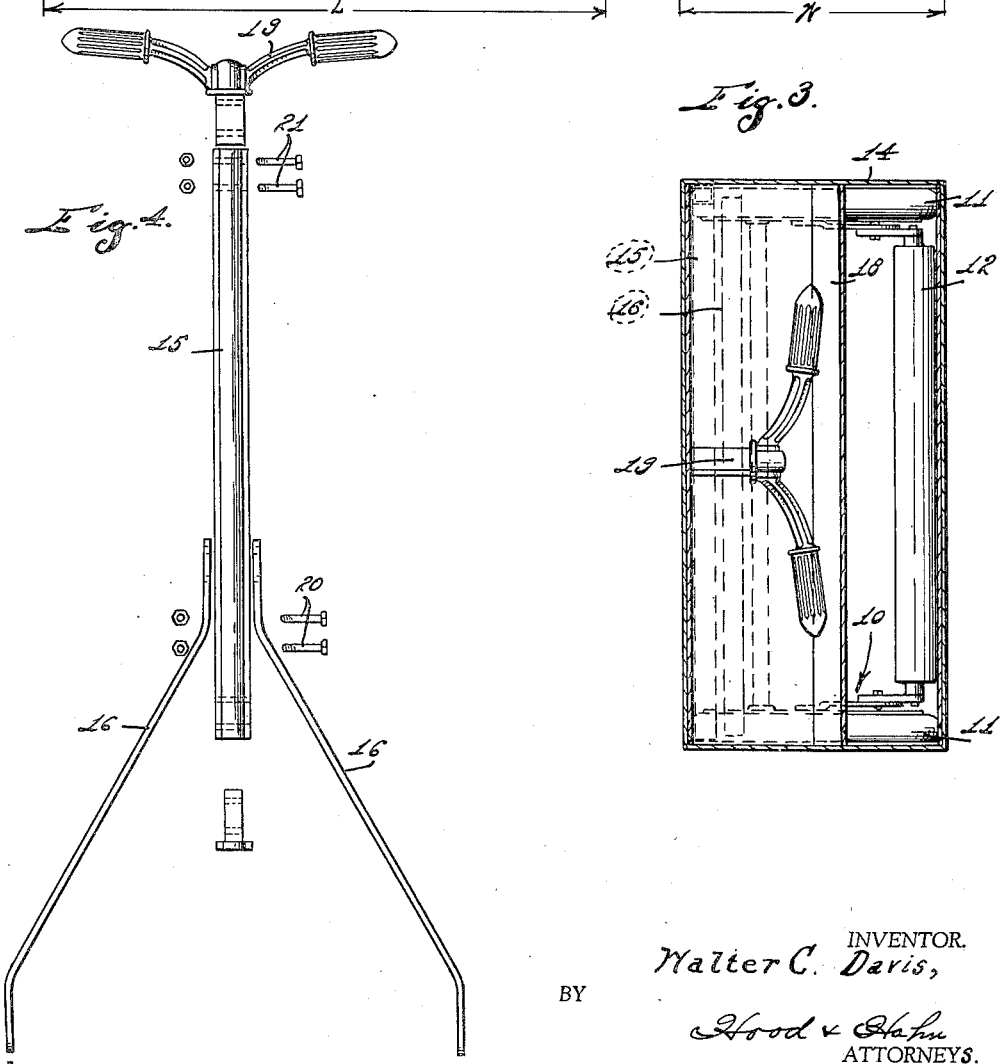
INVENTOR.
Walter C. Davis,
BY
Hood & Hahn
ATTORNEYS.

May 5, 1942.　　　　　W. C. DAVIS　　　　　2,281,923
LAWN MOWER PACKAGE
Filed April 29, 1940　　　　2 Sheets-Sheet 2
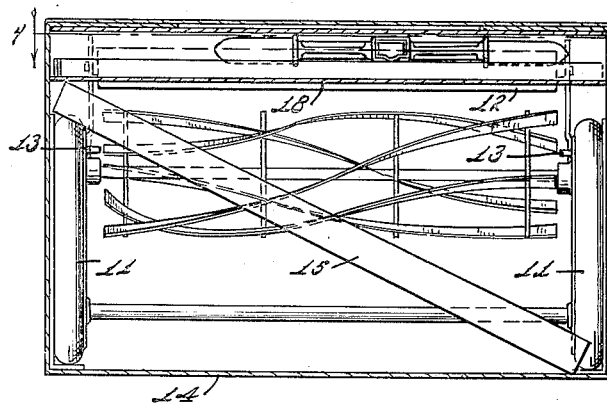
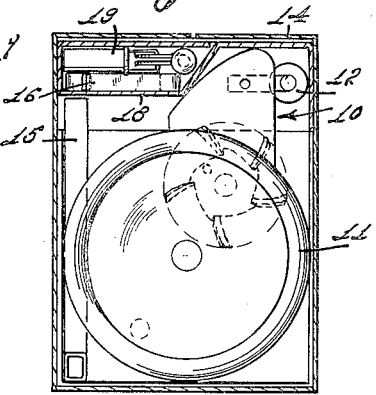
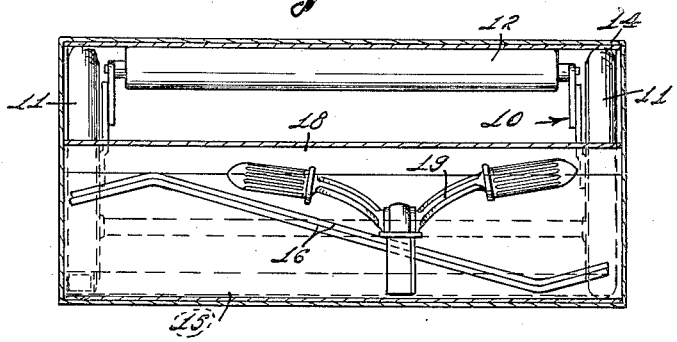
INVENTOR.
Walter C. Davis,
BY
Hood & Hahn
ATTORNEYS.

Patented May 5, 1942

2,281,923

UNITED STATES PATENT OFFICE 2,281,923

LAWN MOWER PACKAGE

Walter C. Davis, Richmond, Ind., assignor to G. W. Davis Corporation, Richmond, Ind., a corporation of Indiana Application April 29, 1940, Serial No. 332,222

1 Claim. (Cl. 206—46)

The object of my invention is to make more efficient and less costly the wholesale and retail distribution of hand-driven lawn mowers.

Hand-driven lawn mowers comprise a cutter-carrying wheel-and-roller-supported main body and a push-bar or handle pivotally attached to and separable from the main body. The main bodies of these mowers have an overall dimension, transverse the line of travel, generally varying from 14" to 18" depending upon the length of the cutter and consequent width of the swath to be cut. This dimension will hereafter be referred to as the mower width. The height of the mower approximates the diameter of the driving wheels, and fore-and-aft length exceeds height and is considerably less than width. The push bars or handles have an overall length of about 46" with a cross-bar or T-head at the upper end to be grasped by the operator, and a fork at the lower end for pivotal connection with the main body of the mower between the supporting wheels and the roller, so that operators of varying heights may readily apply the requisite driving force. In most instances these push-bars or handles comprise a main stem, a pair of readily separable fork irons, and a cross head, the main shank having a length considerably exceeding the width of the mower.

The manufacturer, in preparing these mowers for shipment to jobbers and dealers, heretofore, has boxed or crated individual main bodies. Sometimes the fork irons have been detached and packed in the box containing the main body of the mower, but the push-bars or handles have been too long to be contained in the main body of the box and therefore the handles have generally been shipped to jobbers and dealers in bundles of five, with occasional bundles of six to nine where a single order called for six to nine mowers.

Most manufacturers produce a price grade line of mowers, the prices varying according to construction and style of the main body and handle. The consequence has been that, for many years, in the transit from manufacturer to jobber, from jobber to dealer and from dealer to user, handles become separated from mowers for which they were intended and errors of selection and application have been continuous sources of controversy and annoyance. Further than this, separately bundled handles become marred during shipment and rehandling and the dealer finds himself offering a perfectly fitted and decorated mower with a marred handle.

I have discovered that by properly proportioning the handle shank and fork irons, I am able to pack all of the parts for a complete mower in the same box or container which has heretofore been used only as a container for the main body of the mower, thereby eliminating all possibility of loss or misapplication of parts for retail delivery, assembly and display and assuring delivery of a complete mower to the consumer with all of the parts in perfect condition.

The accompanying drawings illustrate my invention.

Fig. 1 is a vertical sectional view of a complete packaged lawn mower embodying my invention;

Fig. 2 a vertical section on a plane at right angles to the plane of Fig. 1;

Fig. 3 a horizontal section; and

Fig. 4 a plan of my improved handle.

Figs. 5, 6, and 7 are, respectively, like Figs. 1, 2 and 3 but showing a different arrangement of the fork irons.

In the drawings 10 indicates the main body of the mower with its traction wheels 11, rear roller 12 and pivot pins 13 for the fork irons of the handle. The container 14 is a standard container which has long been in use as a container for the main body and having internal width W, length L, and height H corresponding closely with the width W, length L, and height H of the mower body, as defined above.

In order that the handle may be readily packed in the smallest container within which the main body 10 may be placed, I make the shank 15 of the handle considerably shorter than has heretofore been customary and I correspondingly lengthen the fork irons 16, 16. The shank 15 is conveniently a trifle longer than the width of the main body 10 and not longer than a diagonal of the interior of the container so that, as shown in the drawings, one end of the shank may be tucked under one of the wheels 11 and the other end laid on the other wheel 11. As these wheels ar now commonly provided with rubber tires, the shank will ride comfortably in this position without marring. In the absence of rubber tires, small pads may be placed in position to protect the handle shank.

The accompanying necessary lengthening of the fork irons 16, 16 does not carry their lengths to materially exceed the width of the main body so that the leg irons may be conveniently arranged alongside the main body 10, as shown in Figs. 1 to 2, or laid upon the pad 18 (Figs. 5 to 7), which is laid upon the main body 10 and forms a support for the cross bar 19 of the handle.

The fork irons 16, 16 are detachably securable to shank 15 by bolts 20 in the usual manner as shown, and the cross bar 19 is detachably securable to the other end of shank 15 by bolt 21, as usual. Other means of detachably securing the fork irons and cross-bar to the handle shank may, of course, be adopted without departing from my invention.

I have found it advisable, in the case of the usual smallest 12" size of mower, to pack it in containers of the same size as those used for a 14" mower, suitable filler pads being inserted against one or both of the traction wheels to prevent rattling.

The fundamental characteristic of my invention is a multi-part mower handle which, when assembled, has length and strength sufficient to adequately serve in the conventional manner, and with no individual part having a length greater than an available internal dimension of a container within which the main body of the mower may be packed.

By proportioning the operating handle of a lawn mower relative to the main body of the mower in the manner described, I have been able to provide a commercially acceptable lawn mower package insurably containing all of the necessary parts of the mower yet having a size no greater than packages which have been, for many years, made to contain only the main body of the mower. By this means I have reduced shipping costs and, at the same time, insured accuracy of delivery to the ultimate consumer.

The present method of shipping lawn mower bodies in individual boxes and their handles in accompanying bundles results in much confusion. Every manufacturer produces various styles of mowers, many of which have distinctive handles. In many instances two or more such manufacturers are located in the same city. Pooled shipments (either in carload lots or less than carload lots) are common. Many jobbers handle the products of several competing manufacturers. Most retailers do likewise. Both jobbers and retailers find it necessary to unbundle the handles. Distribution of pooled shipments by the common carrier often results in delivery of handles made by one manufacturer with mower bodies produced by a competitor, or delivery of bundles of handles for one style of mower with mowers of another style, with resultant claims for shortage.

By packaging mowers according to my present invention all of these annoying difficulties and possibility of shortage claims are avoided. Pooled shipments by competing manufacturers in the same city may be made without possibility of annoying confusion. Each package contains all of the proper parts for a complete mower insured against possibility of confusion or loss of proper parts.

It will, of course, be understood that while the drawings illustrate a metal handle that a wooden shank handle may be substituted so long as the wooden shank and fork arms are properly proportioned.

I claim as my invention:

A lawn mower package comprising, an assembled lawn mower main body, a container closely enclosing said main body, a one-piece handle-shank completely enclosed in said container, handle-shank extension irons also enclosed in said container, and a handle-shank cross bar also enclosed in said container; the extension irons being attachable to the handle shank and to the main body of the mower; the handle shank having a length no greater than an interior diagonal dimension of the container and the extension irons, when connected and attached to the main body of the mower, having a substantially standard effective length adequate for proper manual manipulation of the mower.

WALTER C. DAVIS.